United States Patent
Bechtle et al.

[11] Patent Number: 6,007,093
[45] Date of Patent: Dec. 28, 1999

[54] APPARATUS AND METHOD FOR DEACTIVATING AN AIRBAG

[75] Inventors: Rolf Bechtle, Bietigheim-Bissingen; Walter Haecker, Tamm; Herbert Boegge, Wiernsheim, all of Germany

[73] Assignee: Dr.Ing. h.c.F. Porsche AG, Weissach, Germany

[21] Appl. No.: 08/895,902

[22] Filed: Jul. 17, 1997

Related U.S. Application Data

[63] Continuation-in-part of application No. 08/803,384, Feb. 20, 1997.

[30] Foreign Application Priority Data

| | | | |
|---|---|---|---|
| Jul. 17, 1996 | [DE] | Germany | 196 28 763 |
| May 30, 1997 | [DE] | Germany | 197 22 734 |

[51] Int. Cl.⁶ .................................................. B60R 21/32
[52] U.S. Cl. .......................................................... 280/735
[58] Field of Search .................................. 280/734, 735; 297/216.1; 180/273, 268

[56] References Cited

U.S. PATENT DOCUMENTS

| | | |
|---|---|---|
| 3,766,612 | 10/1973 | Hattori . |
| 5,468,014 | 11/1995 | Gimbel et al. ............................ 280/735 |
| 5,605,348 | 2/1997 | Blackburn et al. ...................... 280/735 |
| 5,816,611 | 10/1998 | Parn . |

FOREIGN PATENT DOCUMENTS

| | | |
|---|---|---|
| 4243826 | 6/1994 | Germany . |
| 4327341 | 2/1995 | Germany . |
| 4426677 | 2/1995 | Germany . |

*Primary Examiner*—Eric Culbreth
*Attorney, Agent, or Firm*—Evenson McKeown Edwards & Lenahan, PLLC

[57] ABSTRACT

An apparatus and a method for deactivating an airbag in a motor vehicle with at least one vehicle seat, to which a child seat placed on the seat can be fastened. A device is provided for deactivating an airbag located in front when the child seat is mounted. In order to allow such a device to be retrofitted simply and economically even in existing mass-produced vehicles, the device is formed by a tongue additionally mounted on the child seat and a latch connected in an active relationship with a central triggering unit. The airbag is deactivated by inserting the tongue into the latch and is reactivated by releasing the connection. For this purpose, the latch has an integrated sensor connected by a lead to the central triggering unit. In order to increase the certainty that the airbag will be shut off when the child seat is mounted, the sensor is made redundant.

23 Claims, 2 Drawing Sheets

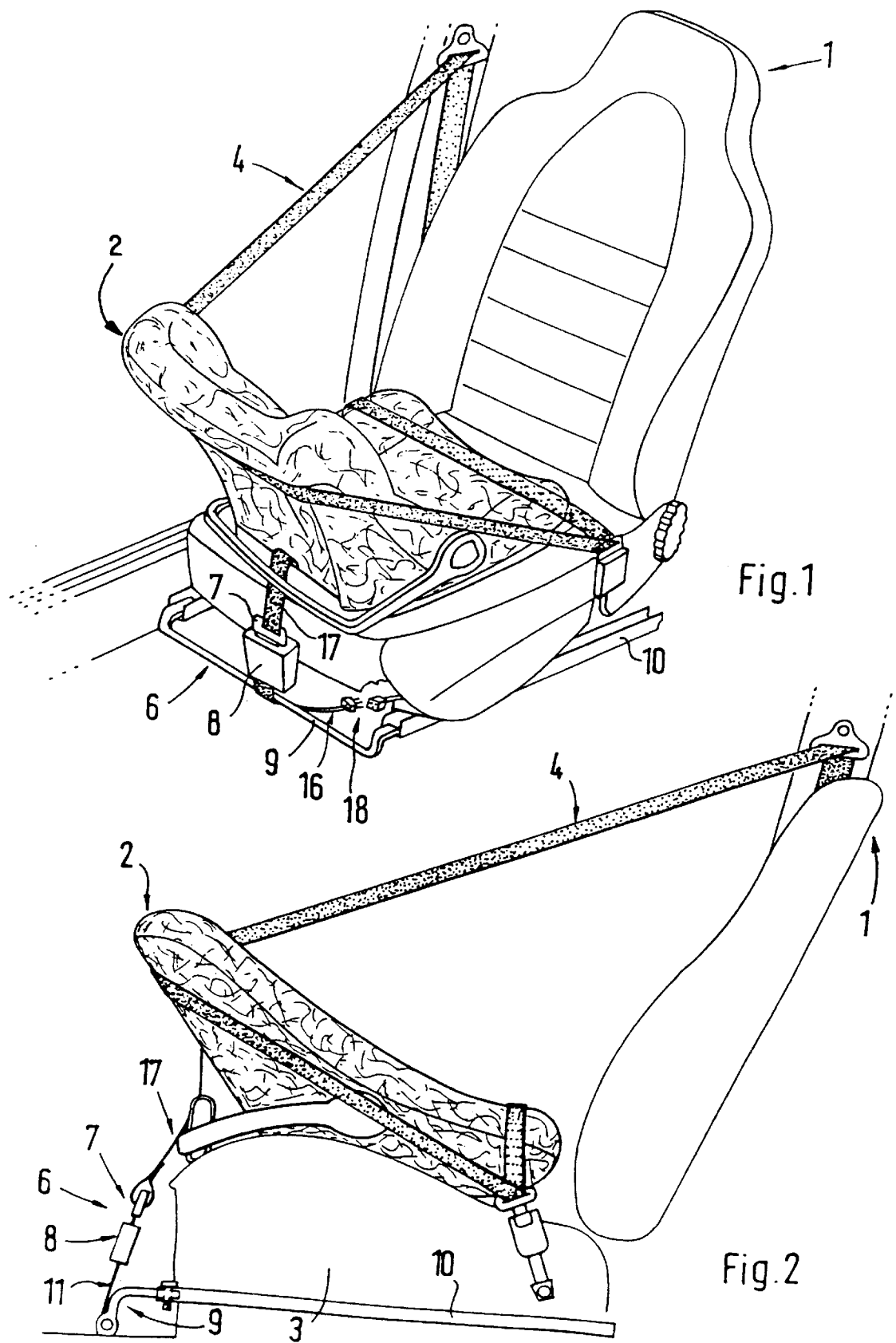

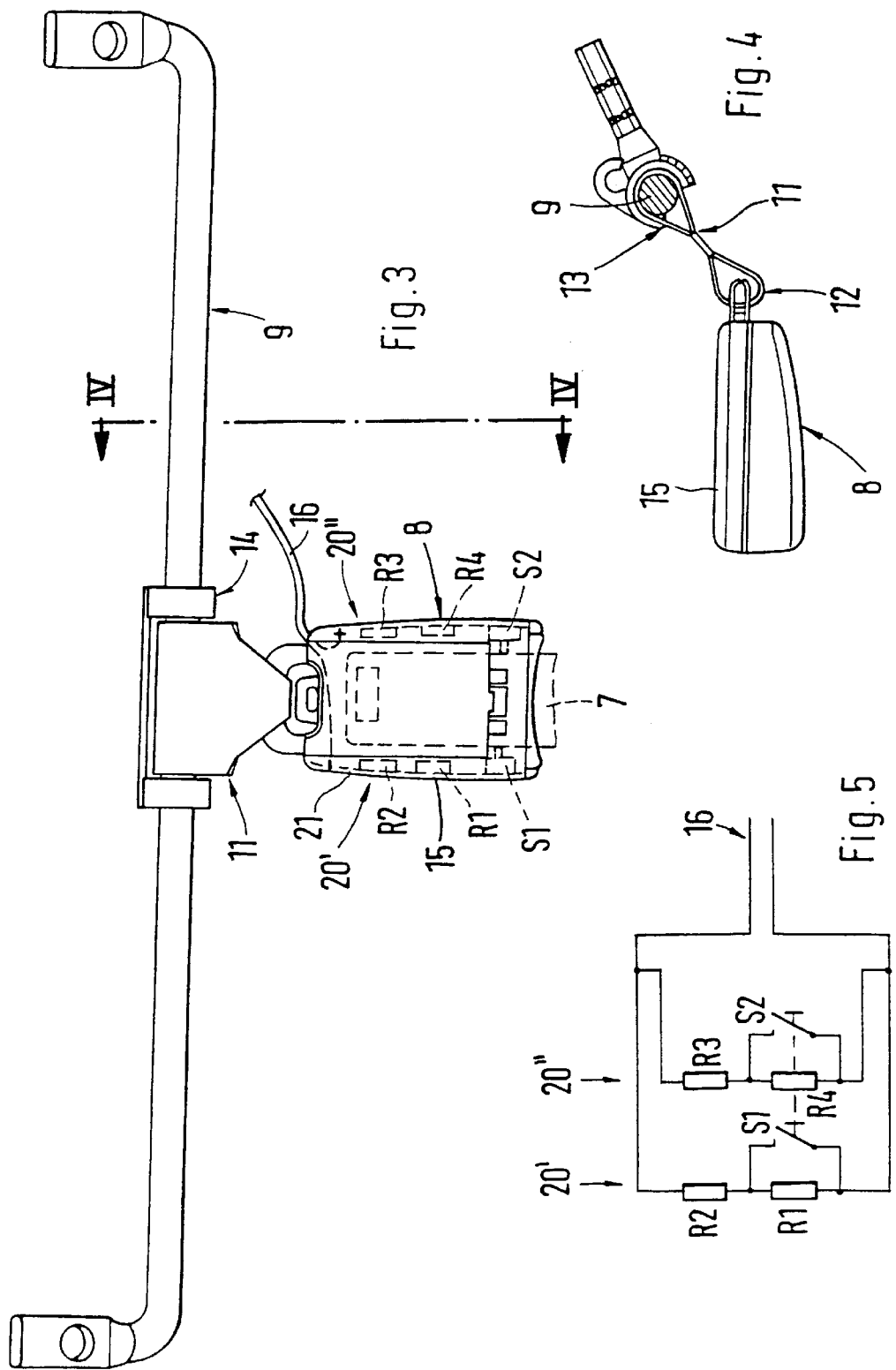

APPARATUS AND METHOD FOR DEACTIVATING AN AIRBAG

This application is a continuation-in-part of U.S. Ser. No. 08/803,384, filed Feb. 20, 1997, pending and claims the priority of German Application No. 196 28 763.4 filed in Germany on Jul. 17, 1996 and No. 197 22 734.1 filed in Germany on May 30, 1997, the disclosures of which are expressly incorporated by reference herein.

BACKGROUND AND SUMMARY OF THE INVENTION

The invention relates to an apparatus and method for deactivating an airbag in a motor vehicle.

The motor vehicle has at least one vehicle seat, to which a child seat, placed upon it, can be fastened, with a device being provided to deactivate an airbag located in front when the child seat is mounted. In order to allow a device of this kind to be retrofitted simply and economically even in existing mass-produced vehicles, the device is constituted by a tongue additionally mounted on the child seat and a latch in an active connection with a central triggering unit, with the airbag being deactivated by inserting the tongue into the latch and reactivated when the connection is broken. For this purpose, the latch has an integral sensor connected by a lead with a central triggering unit. The sensor is constructed in a redundant manner in order to improve reliability.

Advantageously, the certainty that the airbag will be shut off when the child seat is mounted is considerably increased by this measure so that a child sitting in the child seat is better protected against the airbag being triggered.

According to the present invention, an apparatus for deactivating an airbag in a motor vehicle is provided, comprising: at least one vehicle seat; a child seat which is mountable on said vehicle seat; a device for deactivating an airbag located in front of the child seat when the child seat is mounted on said vehicle seat, said device comprising a tongue mounted on the child seat, and a latch in an active connection with a central triggering unit, said airbag located being deactivated by inserting the tongue into the latch and being reactivated by releasing the tongue from the latch, said latch having an integral sensor connected by a connecting lead to the central triggering unit, said sensor being made in redundant form.

According to the present invention, a method for deactivating an airbag in a motor vehicle having at least one vehicle seat and a child seat which is mountable on said vehicle seat is provided, comprising: providing a device for deactivating an airbag located in front of the child seat when the child seat is mounted on said vehicle seat, said device comprising a tongue mounted on the child seat, and a latch having an integral sensor in an active connection with a central triggering unit, said sensor being made in redundant form; deactivating said airbag via said central triggering unit when said tongue is inserted into said latch; and reactivating said airbag via said central triggering unit when said tongue is released from said latch.

According to certain preferred embodiments, the redundant system is formed by using duplicate sensors. This double installation of the sensor significantly reduces the probability that the insertion of the tongue into the latch will not be recognized by a defective sensor.

According to certain preferred embodiments, a switch element is provided in the sensor. With a switch element, for example a switch or a reed contact, the insertion of the tongue into the latch can be recognized very reliably in a known manner.

According to certain preferred embodiments, the sensor is formed as a chain of two resistances connected in series, with the switch element bridging one of the resistances. With such a design for the sensor, in addition to the unswitched state of the switching element (both resistances active) and the switched state of the switching element (only one resistance active), a break in the lead (infinite resistance) and a short circuit (resistance=0) can be identified.

According to certain preferred embodiments, the resistance chains of a redundant system of sensors are connected in parallel. By virtue of the two states described above, additional identification can be performed to determine whether one of the two sensors or one of the switch elements contained in the two sensors is defective.

According to certain preferred embodiments, the central triggering unit evaluates the signal from the sensor and permits triggering of the airbag located in front only if the evaluation indicates beyond a doubt that the tongue is not inserted into the latch. This evaluation is preferably intended to be performed by comparing a total resistance of the sensor with a set value range. In this way, in case of doubt, an airbag located in front of the child seat will not be triggered, so that even if a child seat is in fact mounted but this condition is not recognized because of a defect, a child sitting in the child seat will be protected against the airbag being triggered.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective front view at an angle, of a rearward-facing child seat placed on the seat cushion of a vehicle seat according to a preferred embodiment of the present invention;

FIG. 2 is a side view of the vehicle seat with the child seat in place facing rearward;

FIG. 3 is a top view of the cross member running transversely and containing the latch;

FIG. 4 is a section along line IV—IV in FIG. 3; and

FIG. 5 is a wiring diagram for a sensor provided in the latch.

DETAILED DESCRIPTION OF THE DRAWINGS

The motor vehicle, not shown in greater detail in the figures, has at least one vehicle seat 1 with a child seat 2 fastenable thereon. The child seat 2 mounted on seat part 3 of vehicle seat 1 is held in place by a conventional three-point seat belt 4 that serves to secure a vehicle occupant sitting on the vehicle seat when child seat 2 is removed. Child seat 2 can be aligned in the direction of travel, not shown in greater detail, or opposite the direction of travel.

Child seat 2 is provided with its own seatbelt, not shown (suspender belt or catcher) to hold a child.

In order to keep the airbag located in front from opening in a vehicle collision and striking child seat 1 and thus possibly causing serious injury to the child, a device 6 is provided to deactivate the airbag, not shown, when child seat 2 is mounted.

Device 6 comprises a tongue 7 additionally mounted on child seat 2 and a latch 8 in an active connection with a central triggering unit for the airbags, not shown in greater detail, with the airbag being deactivated by manually inserting tongue 7 into latch 8 and reactivated by releasing the connection. Latch 8 is mounted on a cross member 9 that runs transversely and is located in front of vehicle seat 1, looking in the direction of travel. The approximately U-shaped cross member 9 as seen in a top view is releasably fastened at its two ends, running in the longitudinal direction of the vehicle, to the corresponding seat rails 10. This is accomplished by bolts, for example.

Latch 8 extends in a central area of the transverse extent of cross member 9, which has a circular cross section, with a short belt section 11 running between cross member 9 and latch 8. The transverse portion of cross member 9 runs near the floor of the vehicle.

In the illustrated embodiment, a first looped end area 13 of belt section 11 fits around the transverse cross member 9, while a second eye-shaped end area 12 is connected with latch 8 (FIG. 4).

The looped end area 13 that surrounds cross member 9 is protected against shifting sideways by a stop 14 clipped in place. Latch 8 has a sensor 20 inside housing 15 which is connected by a lead 16 to the central triggering unit. The central triggering unit is reprogrammed by the dealer when a child seat 2 is used.

The sensor 20, shown in greater detail in FIG. 3, is located inside housing 15 of latch 8 and is made redundant, in duplicate in this case, as a first sensor 20' and a second sensor 20". The first sensor 20' consists of a PC board 21 on which a first switch S1 and two resistances R1, R2 are mounted as a first switching element. First switch S1 is actuated by tongue 7 when the latter is inserted into latch 8. The second sensor 20" is analogous in design and has a second switch S2 as a second switching element as well as two additional resistances R3 and R4.

The tongue 7 is located in a central area of the transverse extent of child seat 2, with a belt section 17 running between tongue 7 and child seat 2.

Tongue 7 and latch 8 for deactivating the airbag have dimensions different from those of the tongue and latch of seatbelt 4 for vehicle seat 1 in order to rule out improper connection.

In FIGS. 1 and 2, the tongue 7 of child seat 2 is shown inserted into the corresponding latch 8, thus deactivating the airbag.

In FIG. 1, connection 18 of the lead 16 that leads to the central triggering unit is shown in the disconnected position; in the operating position the two ends of the plug of plug-in connection 18 are connected with one another.

According to FIG. 1, a passenger seat is shown with a rearward-facing child seat placed upon it. In this arrangement, device 6 serves to deactivate the passenger airbag. Device 6 can be associated with a rear vehicle seat in which the corresponding airbag is located on the back of the front seat. In addition, the child seat can be reversed on the vehicle seat from the illustrated position, in other words, facing forward on the vehicle seat.

The operation of the system of sensors 20' and 20" is explained in greater detail with reference to the wiring diagrams shown in FIG. 5. Each of the sensors 20' and 20" consists of a chain of two resistances R1/R2 and R3/R4, with the two sensors 20' and 20" being connected in parallel and connected with connecting lead 16. Resistances R1 and R4 as well as R2 and R3 have the same resistance value, namely:

R1=R4=4.02 k$\Omega$; R2=R3=511 $\Omega$

The following switch states result:

| State | Total Resistance (Ohms) | Suppression of Airbag Triggering |
|---|---|---|
| tongue 7 not inserted | 2,266 | no |
| tongue 7 inserted | 256 | yes |
| tongue 7 inserted, S1 or S2 defective | 459 | yes |
| tongue 7 inserted, sensor 20' or 20" defective | 511 | yes |
| tongue 7 not inserted, sensor 20' or 20" defective | 4,531 | no |
| connecting lead 16 defective | infinite | no |

In the evaluation of the total resistance of sensor 20 by central triggering unit, consideration must be given to the fact that in a triggering unit that is programmed for the use of a child seat the non-triggering of the passenger side airbag takes priority. As long as no assurance is provided that no child seat is mounted, triggering of the passenger side airbag is suppressed.

The values of resistances R1 to R4 in the present example are advantageously chosen such that a clear identification of a tongue 7 not being inserted is possible. This is achieved by making the resistance values of resistances R1 and R4 bridged by switches S1 and S2 much greater than the resistance values of the two other resistances R2 and R3 which are not bridged.

The evaluation of the total resistance of sensor 20 by the central triggering unit is performed by assigning the total resistance to resistance ranges as indicated in the following table. In dimensioning the resistance ranges for the states "tongue 7 inserted," "tongue 7 inserted, defect," and "tongue 7 not inserted" both the component tolerances of resistances R1 to R4 and the evaluation tolerances in the central triggering unit were taken into account.

| Total Resistance (Ohms) | Result of Evaluation: State |
|---|---|
| <70 | defect |
| 70–240 | not defined |
| 240–270 | tongue 7 inserted |
| 270–435 | not defined |
| 435–600 | tongue 7 inserted, defect |
| 600–2020 | not defined |
| 2020–2320 | tongue 7 not inserted |
| 2320–4300 | not defined |
| >4300 | defect |

With the above arrangement, the airbag is triggered when the total resistance value is between 2020 ohms and 2320 ohms and the airbag is not triggered when the total resistance value is between 240 ohms and 270 ohms. In all other resistance ranges, an error message is output by the central triggering unit, and the nature of the defect (switch defective, resistance defective, connecting lead defective, etc.) possibly being output as well. Similarly, an error message is output when one of the states ("tongue 7 inserted," "tongue 7 inserted, defect," or "tongue 7 not inserted") is determined in a triggering unit that is not programmed for the use of a child seat. It is possible that with such an unambiguous detection of the state "tongue 7 inserted," or "tongue 7 inserted, defect," a central triggering unit that has not been appropriately programmed can also suppress the triggering of the airbag.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for deactivating an airbag in a motor vehicle, comprising:

at least one vehicle seat;

a child seat which is mountable on said vehicle seat;

a device for deactivating an airbag located proximate the child seat when the child seat is mounted on said vehicle seat, said device comprising a single tongue mounted on the child seat, and a single latch in an active connection with a central triggering unit, said airbag being deactivated by inserting the tongue into the latch and being reactivated by releasing the tongue from the latch, said latch having an integral sensor connected by a connecting lead to the central triggering unit, said sensor being made in redundant form.

2. An apparatus according to claim 1, wherein said sensor is provided in duplicate.

3. An apparatus according to claim 2, wherein said sensor has at least one switch element.

4. An apparatus according to claim 1, wherein said sensor has at least one switch element.

5. An apparatus according to claim 4, wherein said sensor is made in the form of a chain of two resistances connected in series, with said switch element bridging one of the resistances.

6. An apparatus according to claim 5, wherein the sensor comprises at least two chains of resistances connected in parallel.

7. An apparatus according to claim 1, wherein the central triggering unit evaluates a signal from the sensor and permits activation of said airbag only when evaluation indicates that tongue is not inserted into latch.

8. An apparatus according to claim 7, wherein said evaluation is performed by a comparison of a total resistance of said sensor with a set value range.

9. An apparatus according to claim 1, wherein said sensor has a resistance within a predetermined range when said tongue is not inserted in said latch and said sensor is not defective, said sensor having a resistance outside of said predetermined range when either of (a) said tongue is inserted in said latch or (b) said sensor is defective, said central triggering unit activating said airbag only when sensing a resistance within said predetermined range.

10. A method for deactivating an airbag in a motor vehicle having at least one vehicle seat and a child seat which is mountable on said vehicle seat, comprising:

providing a device for deactivating an airbag located proximate the child seat when the child seat is mounted on said vehicle seat, said device comprising a single tongue mounted on the child seat, and a single latch having an integral sensor in an active connection with a central triggering unit, said sensor being made in redundant form;

deactivating said airbag via said central triggering unit when said tongue is inserted into said latch; and reactivating said airbag via said central triggering unit when said tongue is released from said latch.

11. A method according to claim 10, wherein said sensor is provided in duplicate.

12. A method according to claim 11, wherein said sensor has at least one switch element.

13. A method according to claim 10, wherein said sensor has at least one switch element.

14. A method according to claim 13, wherein said sensor is made in the form of a chain of two resistances connected in series, with said switch element bridging one of the resistances.

15. A method according to claim 14, wherein the sensor comprises at least two chains of resistances connected in parallel.

16. A method according to claim 10, wherein the central triggering unit evaluates a signal from the sensor and permits activation of said airbag only when evaluation indicates that tongue is not inserted into latch.

17. A method according to claim 16, wherein said evaluation is performed by a comparison of a total resistance of said sensor with a set value range.

18. A method according to claim 10, wherein said sensor has a resistance within a predetermined range when said tongue is not inserted in said latch and said sensor is not defective, said sensor having a resistance outside of said predetermined range when either of (a) said tongue is inserted in said latch or (b) said sensor is defective, said central triggering unit activating said airbag only when sensing a resistance within said predetermined range.

19. An apparatus for deactivating an airbag in a motor vehicle, comprising:

at least one vehicle seat;

a child seat which is mountable on said vehicle seat;

a device for deactivating an airbag located proximate the child seat when the child seat is mounted on said vehicle seat, said device comprising a tongue mounted on the child seat, and a latch in an active connection with a central triggering unit, said airbag being deactivated by inserting the tongue into the latch and being reactivated by releasing the tongue from the latch, said latch having an integral sensor connected by a connecting lead to the central triggering unit, said sensor being made in redundant form, said sensor comprising a chain of two resistances connected in series, with a switch element bridging one of the resistances.

20. A method for deactivating an airbag in a motor vehicle having at least one vehicle seat and a child seat which is mountable on said vehicle seat, comprising:

providing a device for deactivating an airbag located proximate the child seat when the child seat is mounted on said vehicle seat, said device comprising a single tongue mounted on the child seat, and a latch having an integral sensor in an active connection with a central triggering unit, said sensor being made in redundant form, said sensor comprising a chain of two resistances connected in series, with a switch element bridging one of the resistances;

deactivating said airbag via said central triggering unit when said tongue is inserted into said latch; and reactivating said airbag via said central triggering unit when said tongue is released from said latch.

21. An apparatus for deactivating an airbag in a motor vehicle, comprising:

a vehicle seat;

at least one airbag located proximate said vehicle seat to be deployed to protect an occupant of said vehicle seat;

a child seat which is mountable on said vehicle seat;

an airbag triggering unit for triggering said at least one airbag;

a tongue coupled to said child seat; and a latch located in said vehicle and configured to receive said tongue, said latch having an integral sensor electrically connected to said airbag triggering unit, said sensor having a resistance within a predetermined range when said tongue is not inserted in said latch and said sensor is not defective, said sensor having a resistance outside of said predetermined range when either of (a) said tongue is inserted in said latch or (b) said sensor is defective, said airbag triggering unit activating said airbag only when sensing a resistance within said predetermined range.

22. An apparatus according to claim 21, wherein said sensor is made in the form of a chain of two resistances connected in series, with a switch element bridging one of the resistances.

23. An apparatus according to claim 22, wherein the chains of resistances are connected in parallel.

* * * * *